(12) United States Patent
Dhekale et al.

(10) Patent No.: US 12,031,639 B2
(45) Date of Patent: Jul. 9, 2024

(54) UNIVERSAL LOGIC CIRCUIT FOR ELECTRO-HYDRAULIC ACTUATOR

(71) Applicant: Emerson Process Management Valve Automation, Inc., Houston, TX (US)

(72) Inventors: Shankar Dhekale, Pune (IN); Jason T. Hoffbauer, Upper Sandusky, OH (US)

(73) Assignee: Emerson Process Management Valve Automation, Inc., Houston, TX (US)

( * ) Notice: Subject to any disclaimer, the term of this patent is extended or adjusted under 35 U.S.C. 154(b) by 504 days.

(21) Appl. No.: 17/315,881

(22) Filed: May 10, 2021

(65) Prior Publication Data
US 2021/0348696 A1   Nov. 11, 2021

(30) Foreign Application Priority Data
May 9, 2020   (IN) .............................. 202031019695

(51) Int. Cl.
*G05D 7/00*   (2006.01)
*F16K 31/42*   (2006.01)

(52) U.S. Cl.
CPC ............. *F16K 31/42* (2013.01); *G05D 7/005* (2013.01)

(58) Field of Classification Search
None
See application file for complete search history.

(56) References Cited

U.S. PATENT DOCUMENTS

| | | | |
|---|---|---|---|
| 3,603,126 A | 9/1971 | Newman et al. | |
| 3,774,641 A | 11/1973 | Mindner et al. | |
| 4,064,694 A | 12/1977 | Baudoin | |
| 4,860,158 A * | 8/1989 | Brown | F04B 17/046<br>361/165 |
| 5,111,383 A * | 5/1992 | Kimura | G05B 19/0428<br>318/563 |
| 5,422,808 A * | 6/1995 | Catanese, Jr. | G05B 19/4063<br>307/64 |
| 5,744,923 A * | 4/1998 | Strauss | H02J 9/061<br>318/563 |

(Continued)

FOREIGN PATENT DOCUMENTS

| | | | | |
|---|---|---|---|---|
| CN | 1707033 A | 12/2014 | | |
| EP | 0402018 A1 * | 12/1990 | ............. | B01J 3/002 |

(Continued)

*Primary Examiner* — Jason Lin
(74) *Attorney, Agent, or Firm* — Quarles & Brady LLP (57) ABSTRACT

Universal control circuitry for an electro-hydraulic valve actuator system includes logic gate circuitry to control one or more of a closing solenoid valve, an opening solenoid valve, an emergency shutdown solenoid valve, and a hydraulic fluid pump motor to route hydraulic fluid through a hydraulic circuit to actuate a valve via a hydraulic actuator according to received commands. The universal control circuitry is configured to control operation for multiple different configurations of a hydraulic valve actuator system including double-acting configurations, single-acting spring-to-open configurations, and single-acting spring-to-close configurations, each with or without an emergency shutdown arrangement (which may be configured to trip based on an external shutdown input alone or in combination with a local system power failure), a hydraulic accumulator, and maintained or momentary input commands.

20 Claims, 7 Drawing Sheets

(56) References Cited

U.S. PATENT DOCUMENTS

| | | | | |
|---|---|---|---|---|
| 5,790,419 | A * | 8/1998 | Matsuda | B62D 5/0493 |
| | | | | 714/24 |
| 5,993,039 | A * | 11/1999 | Crill | G05B 9/02 |
| | | | | 700/79 |
| 7,072,761 | B2 * | 7/2006 | Hawkins | F02D 41/266 |
| | | | | 701/112 |
| 7,183,735 | B2 * | 2/2007 | Heinemann | G05B 19/406 |
| | | | | 318/625 |
| 7,298,170 | B2 * | 11/2007 | Gerhart | G05B 9/02 |
| | | | | 326/38 |
| 7,299,121 | B2 * | 11/2007 | Uruno | F02D 41/266 |
| | | | | 701/101 |
| 8,030,875 | B2 * | 10/2011 | Regunath | G05B 9/02 |
| | | | | 318/552 |
| 9,263,207 | B2 * | 2/2016 | Iwata | H01H 9/547 |
| 10,578,227 | B2 | 3/2020 | Goll | |
| 11,149,872 | B2 * | 10/2021 | Hanson | F16K 31/047 |
| 11,377,947 | B2 * | 7/2022 | Mujica | E21B 47/06 |
| 2007/0009365 | A1 * | 1/2007 | Litterst | B67D 1/1231 |
| | | | | 417/44.1 |
| 2014/0350731 | A1 | 11/2014 | Kim | |
| 2019/0264714 | A1 | 8/2019 | Gagne et al. | |

FOREIGN PATENT DOCUMENTS

| | | | | |
|---|---|---|---|---|
| JP | 2004116103 A * | 4/2004 | | E02F 9/0875 |
| JP | 2013051344 A | 3/2013 | | |
| JP | 2019015406 A * | 1/2019 | | |
| WO | 9424521 A1 | 10/1994 | | |
| WO | WO-2011017670 A1 * | 2/2011 | | B66C 13/066 |
| WO | 2011109017 A1 | 9/2011 | | |

\* cited by examiner

UNIVERSAL LOGIC CIRCUIT FOR ELECTRO-HYDRAULIC ACTUATOR

CROSS-REFERENCE TO RELATED APPLICATIONS

This application claims priority to Indian patent application no. 202031019695, titled Universal Logic Circuit for Electro-Hydraulic Actuator and filed May 9, 2020, the entirety of which is incorporated herein by reference.

FIELD OF THE INVENTION

This disclosure relates generally to valve actuators and, more particularly, to control circuitry to control the operation of an electro-hydraulic valve actuator.

BACKGROUND

Power-operated valve actuators convert a driving force such as pneumatic pressure, hydraulic pressure, or electricity into a linear or rotational motion. Such actuators are coupled to the shaft or stem of an associated valve such that the motion generated by the actuator is imparted to the valve's shaft or stem and thus modulates the position of a connected valve member between open and closed positions to control the flow of fluid through a conduit in which the valve is installed.

An electro-hydraulic valve actuator uses two types of driving force—electricity and hydraulic pressure—to generate motion that is imparted to an associated valve. In particular, an electro-hydraulic actuator utilizes electrical energy to pump hydraulic fluid and to control the flow of the hydraulic fluid within a self-contained hydraulic circuit. The hydraulic fluid imparts a force on one or more moveable components within the hydraulic circuit to generate the motion that drives a connected valve. The present disclosure is related to improved control circuitry to control the flow of hydraulic fluid through the hydraulic circuit.

SUMMARY

Control circuitry for a system that comprises a hydraulic valve actuator includes one or more input channels that are each configured to receive an operational command; one or more user-selectable inputs that are representative of a configuration of the valve actuator; a motor output to cause a motor that is coupled to a hydraulic fluid pump to run; one or more valve outputs that each control an open or closed state of a valve, where each valve is configured to control a flow of hydraulic fluid within the system; and a number of physical logic gates that are responsive to at least signals received at the one or more input channels and the one or more user-selectable inputs to determine a state of the motor output and the one or more valve outputs. The one or more input channels may include one or more local input channels and one or more remote input channels, and the circuitry may further include a mode selector input channel that is configured to receive a signal that indicates whether the system is controlled via local signals at the one or more local input channels or remote signals at the one or more remote input channels. Such control circuitry may additionally include a multiplexer that is configured to pass the local signals or the remote signals to the plurality of physical logic gates based upon a state of a mode selector signal at the mode selector input channel.

The control circuitry may additionally include one or more system status input channels. The one or more system status input channels may be configured to receive signals that are representative of at least one of an indication that a valve that is coupled to the actuator is open, an indication that the valve that is coupled to the actuator is closed, and an indication that a pressure within a hydraulic chamber of the valve actuator is above a threshold.

One of the user-adjustable inputs may be a resistance of a variable resistor. An output of a first one of the physical logic gates may be coupled to an input of a second one of the physical logic gates via a first path through the variable resistor and a second path through a diode, where the first path and the second path are in parallel. Such circuitry may further include a capacitor that is charged by a control voltage via the first path and the second path when an output of the first one of the physical logic gates is in a first state. The capacitor may discharge through the first path and not the second path when the output of the first one of the physical logic gates is in a second state such that the resistance of the variable resistor determines a rate of discharge of the capacitor. The first path may provide a first delay time for a transition of the input of the second one of the physical logic gates to the first state and the second path may provide a second delay time, which is adjustable by a user via the variable resistor, for a transition of the input of the second one of the physical logic gates to the second state.

The one or more user-selectable inputs may include one or more inputs to indicate whether the valve actuator is configured as double-acting or single-acting. The one or more user-selectable inputs may include one or more inputs to indicate whether a single-acting actuator is configured as spring-to-open or spring-to-close. The one or more inputs to indicate whether a single-acting actuator is configured as spring-to-open or spring-to-close may affect the motor output.

An electro-hydraulic valve actuator system may include a hydraulic valve actuator; a hydraulic fluid circuit that includes hydraulic fluid conduit, a hydraulic fluid reservoir, one or more controllable valves that direct flow through the hydraulic fluid conduit, and one or more hydraulic fluid pumps; and control circuitry that is configured to control a state of the controllable valves and the one or more hydraulic fluid pumps and that includes a number of physical logic gates that receive signals that are indicative of a configuration of the system and an operational state of the system to generate outputs to control the state of the one or more controllable valves and the one or more hydraulic fluid pumps. The electro-hydraulic valve actuator system may include a local switch panel that includes a hand/off/auto switch, a close switch, an open switch, and a stop switch. The control circuitry may include remote inputs that are configured to receive a remote close command, a remote open command, and a remote stop command. The control circuitry may include a multiplexer that is configured to pass signals from the local switch panel or from the remote inputs based upon a state of the hand/off/auto switch.

The signals that are indicative of a configuration of the system may include one or more signals that are generated via one or more switches to indicate whether the hydraulic valve actuator is configured as double-acting or single-acting and/or one or more signals that are generated via one or more switches to indicate whether the hydraulic valve actuator is configured as spring-to-open or spring-to-close.

DETAILED DESCRIPTION OF THE INVENTION

Figure 1:
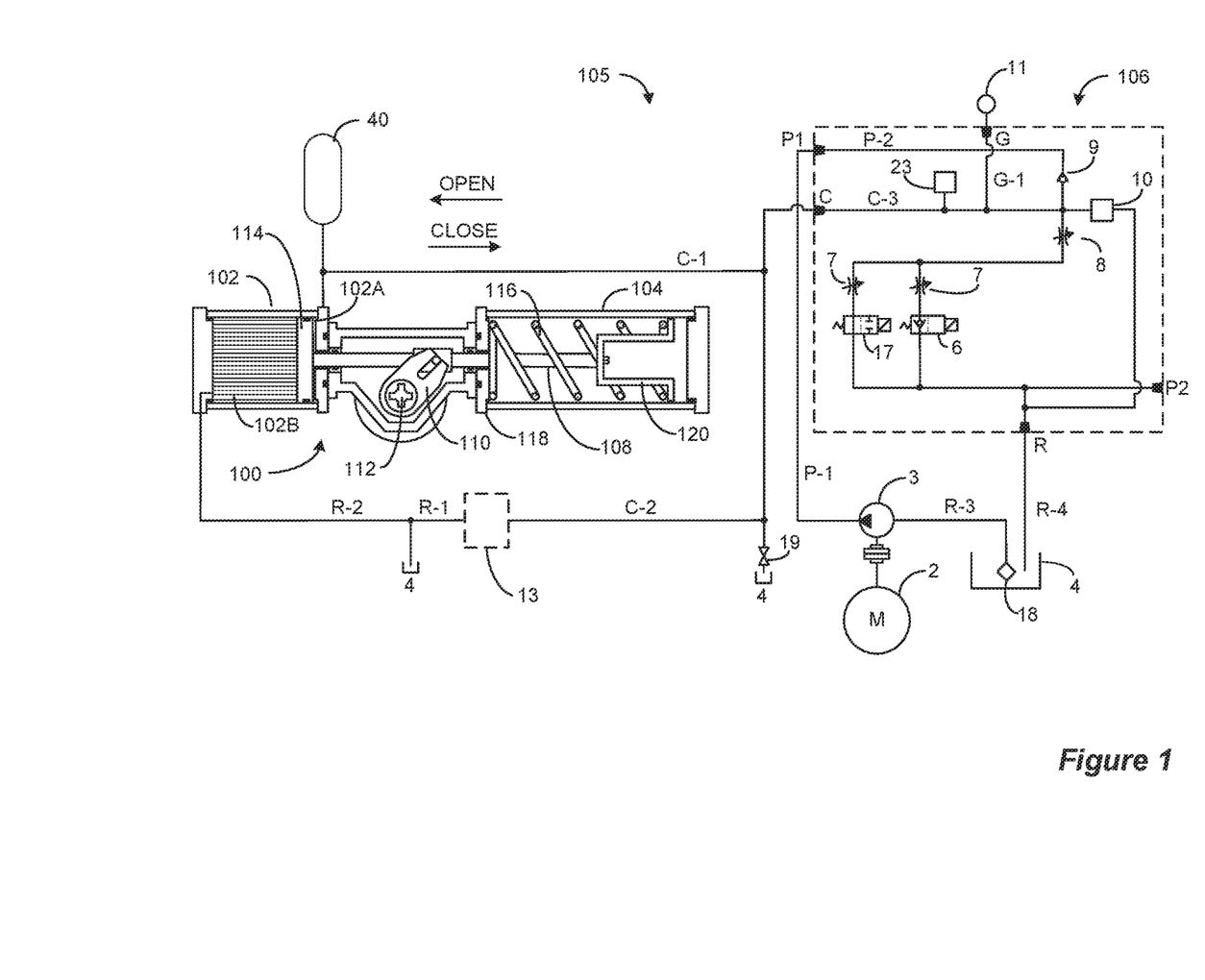
FIG. 1 is a schematic diagram that illustrates a first configuration of an electro-hydraulic actuator system.

FIG. 1 illustrates an electro-hydraulic actuator system 105 that includes an actuator 100 that is driven by hydraulic pressure that is conveyed via hydraulic conduit that makes up a hydraulic circuit. The actuator 100 in FIG. 1 is configured for a single-acting (i.e., hydraulic fluid operates to move the actuator and associated valve in a single direction), spring-to-close configuration with an emergency shutdown (ESD) feature and an accumulator 40 that may allow the associated valve to be stroked (a limited number of times) without operating the hydraulic pump 3 (e.g., upon electrical failure that prevents operation of the pump 3) and/or provide a volume for thermal expansion of hydraulic fluid. The illustrated configuration may be set up for two-wire (open/close (+V) and common), three-wire (open (+V), close (+V), and common), or four-wire (open (+V), close (+V), stop (+V), and common) operation. The actuator 100 includes a hydraulic chamber 102 that is fluidly coupled to the hydraulic circuit. The hydraulic chamber 102 houses a piston 114 with each side of the piston 114 coupled to a different portion of the hydraulic circuit. The piston 114 is coupled to a shaft 108 and is configured to move within the chamber 102.

The shaft 108 extends from the hydraulic chamber 102 to a spring chamber 104. The spring chamber 104 houses a spring 116 that is disposed between a wall 118 of the spring chamber 104 and a spring seat 120 that is attached to an end of the shaft 108. In this position, the spring 116 exerts a force that operates to move the shaft 108 in the close direction (toward the right in the view shown in FIG. 1). Thus, in the absence of an opposing force operating on the piston 114, the spring 116 will move the shaft 108 in the close direction.

Between the hydraulic chamber 102 and the spring chamber 104, the shaft 108 is coupled to a scotch-yoke mechanism 110. The scotch-yoke mechanism 110 converts the linear motion of the shaft 108 into rotational motion of a connector 112, which is oriented orthogonally to the shaft 108 and coupleable to the shaft of an associated valve. For example, when the shaft 108 moves in the close direction, the scotch-yoke mechanism 110 converts that linear motion into a clockwise rotational motion (from the view in FIG. 1) of the connector 112. Likewise, when the shaft 108 moves in the open direction, the scotch-yoke mechanism 110 converts that linear motion into a counterclockwise rotational motion (from the view in FIG. 1) of the connector 112. In a typical configuration, the full linear range of motion of the shaft 108 would correspond to a 90 degree rotation of the connector 112, which would actuate a quarter-turn valve (e.g., a butterfly or ball valve) between the open and closed positions.

Figure 2:
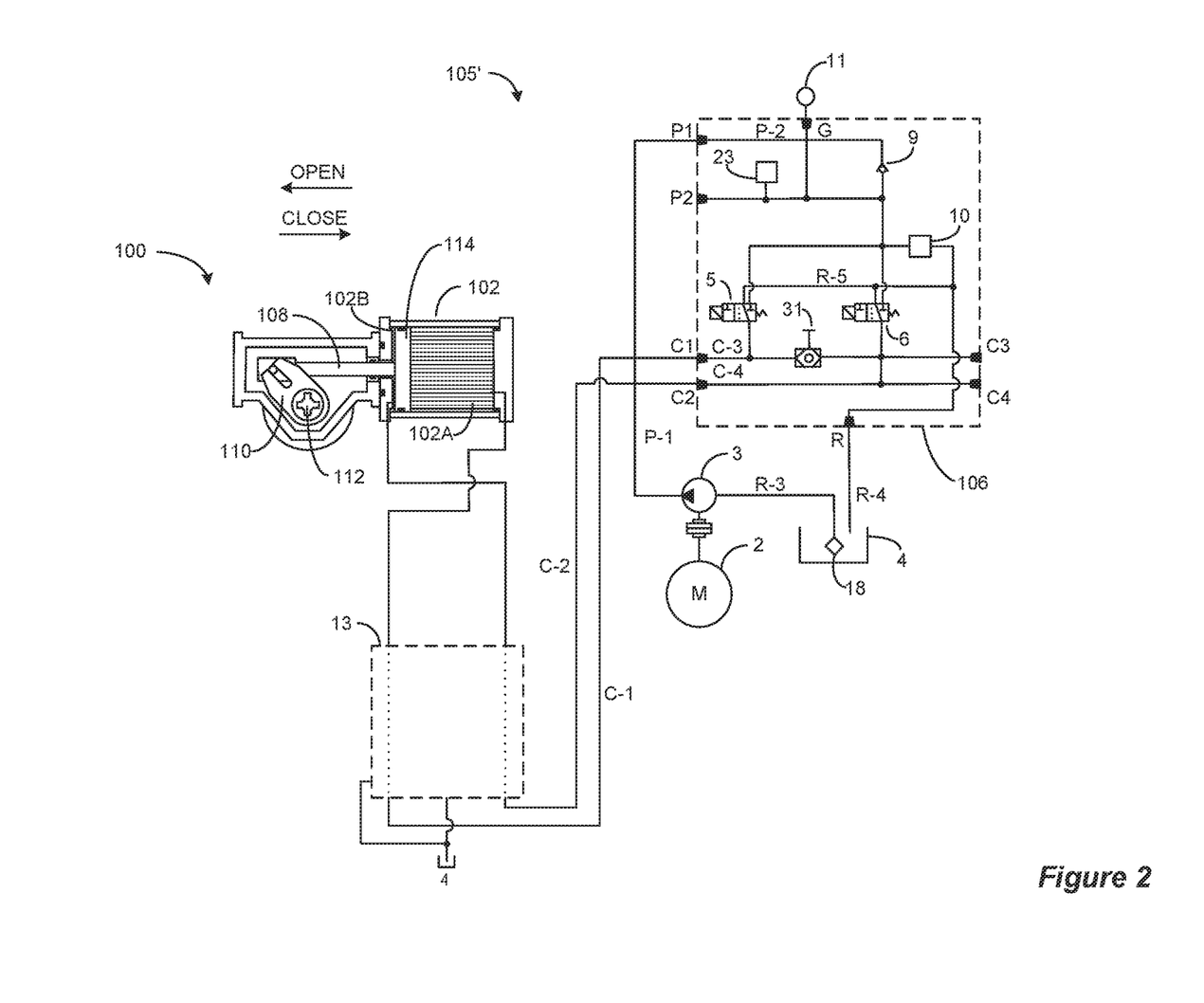
FIG. 2 is a schematic diagram that illustrates a second configuration of an electro-hydraulic actuator system.
Figure 3:
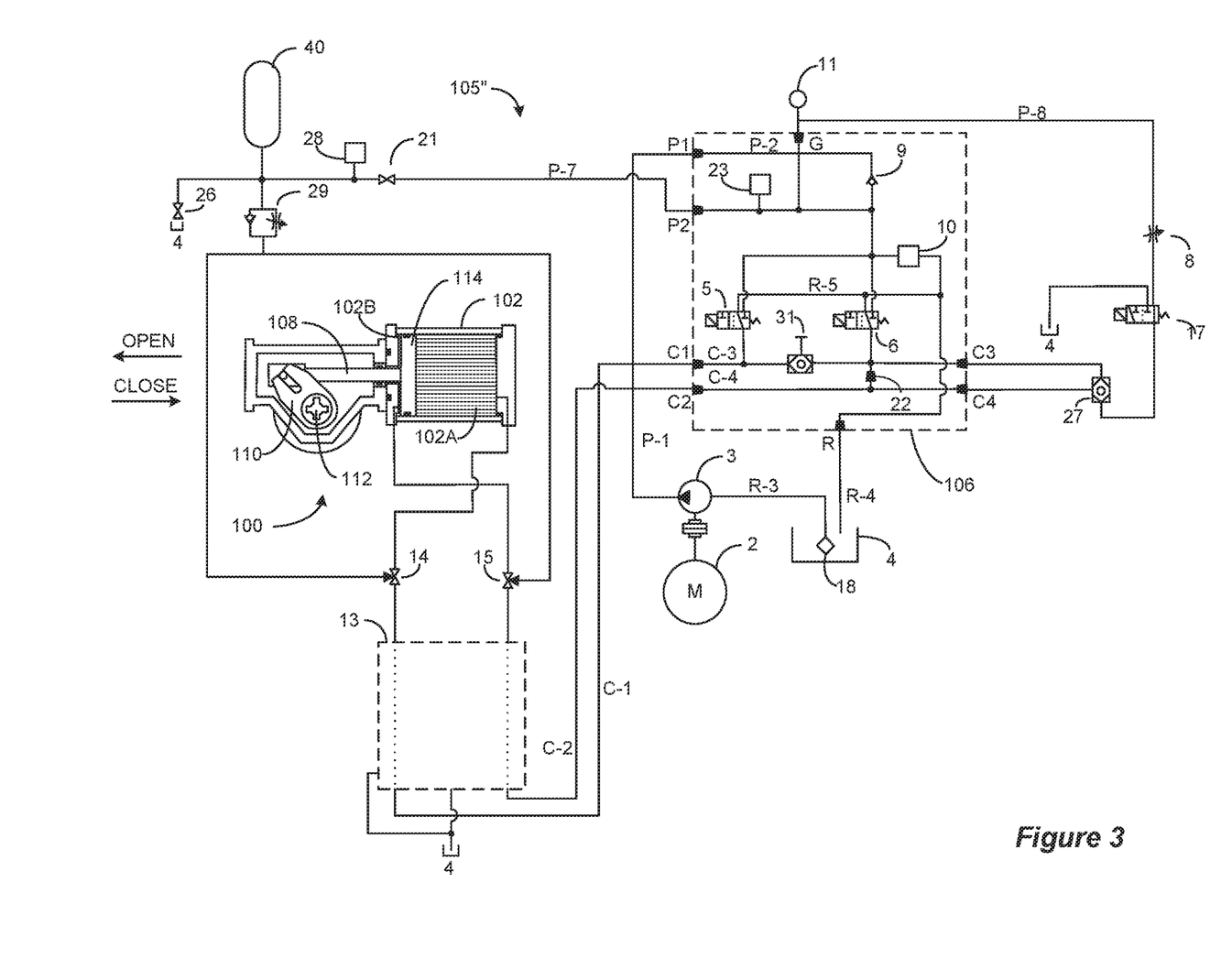
FIG. 3 is a schematic diagram that illustrates a third configuration of an electro-hydraulic actuator system.

The hydraulic circuit includes a manifold 106 that has a first power port P1, a second power port P2 (not used and plugged in the configuration shown in FIG. 1), a cylinder port C, a gauge port G, and a reservoir port R. The cylinder port C is coupled by a first line C-1 to a first chamber 102A of the hydraulic cylinder 102 as well as to the accumulator 40. A line C-2 is coupled between line C-1 and a manual pump assembly 13. The manual pump assembly 13, which has a suction line R-1 that is connected to a hydraulic fluid reservoir 4 (note that while multiple reservoir symbols are shown in FIGS. 1-3, they are all representative of a common reservoir 4) and discharges to line C-2, enables the actuator 100 to be operated by manually pumping hydraulic fluid into line C-1 in the event of the failure of the pump 3. For purposes of simplicity, the features of the manual pump assembly 13 are not described in detail, but it is important to note that check valves within the assembly 13 prevent the flow of hydraulic fluid from the line C-2 to the line R-1 but enable the flow of hydraulic fluid from the line R-1 to the line C-2. A second chamber 102B of the hydraulic cylinder 102 is coupled to the reservoir 4 via a line R-2.

A main pump 3 has a suction line R-3 that is connected to the reservoir 4 and a discharge line P-1 that is connected to the manifold 106 P1 port. Within the manifold, the P1 port is coupled via a line P-2 to a line C-3, which is in turn coupled to the manifold 106 C port. The P-2 line is further connected via two two-way solenoid valves 6, 17 operating in parallel to the manifold 106 P2 and R ports. The R port is coupled to the reservoir 4 via line R-4. The closing solenoid valve 6 is a directional valve that prevents flow from the P1 and C ports to the R port in a de-energized state and permits flow from the P1 and C ports to the R port in an energized state. The ESD solenoid valve 17 permits flow from the P1 and C ports to the R port in a de-energized state and prevents flow from the P1 and C ports to the R port in an energized state. Manual control valves 7 that are located on the P1 and C port side of each solenoid valve 6, 17 enable the rate of flow through each solenoid valve 6, 17 to be limited to adjust the opening and closing speed of the valve. The P-2 and C-3 lines, as well as the lines and components that are connected thereto, are protected by a relief valve 10 that relieves pressure to the R port (and thus the reservoir 4 via the R-4 line) in the event of an over-pressure condition. A check valve 9 prevents backflow from any of the connected lines within the manifold 106 to the P1 port. A manual valve 8 that is positioned between the P1 and C ports and the manual valves 7 is useable in conjunction with the manual pump assembly 13. A pressure switch 23 that is coupled to the C-3 line is triggered when the pressure in the first chamber 102A and the accumulator 40 exceeds a set value. Such pressure is indicated via a pressure gauge 11 that is connected to the G port, which is in turn connected to the C-3 line by the G-1 line.

In operation, when an open command is issued to the electro-hydraulic actuator system 105, the ESD solenoid valve 17 is energized and the closing solenoid valve 6 is de-energized to prevent the flow of hydraulic fluid from the P1 and C ports to the R port and the motor 2 is energized to drive the pump 3. Hydraulic fluid from the reservoir 4 is thus drawn from the reservoir by the pump 3 and transferred to the first chamber 102A. The pressure of the hydraulic fluid within the first chamber 102A operates on the area of the piston 114 to generate a force in the open direction, which overcomes the opposing force provided by the spring 116 to move the piston 114 and the shaft 108 in the open direction. As the piston 114 moves within the chamber 102, any fluid within the second chamber 102B will be exhausted to the reservoir 4. When the valve reaches the fully open position, an open limit switch that is indicative of an open state of the associated valve (not shown) and that is wired to the control circuitry of the electro-hydraulic actuator system 105 indicates that the valve has fully traveled to the desired position. If the electro-hydraulic actuator system 105 is configured without the accumulator 40, the open limit switch indication is utilized by the control circuitry to de-energize the motor 2 and thus stop the pump 3. However, to ensure that the accumulator 40 is fully charged (assuming the accumulator 40 is used for a backup source of power to operate the valve in the event of a pump or power failure and not just for thermal compensation), the control circuitry of the electro-hydraulic actuator system 105 continues to energize the motor 2 until the pressure switch 23 indicates that the high pressure limit has been met, at which point the motor 2 is de-energized. Note that to maintain the valve in the open position, the ESD solenoid valve 17 is continuously maintained in the energized state and the closing solenoid is maintained in the de-energized state.

When a close command is issued to the electro-hydraulic actuator system 105, the closing solenoid 6 is energized, which creates a path between the P1 and C ports and the R port and thus couples the first chamber 102A with the reservoir 4. In this state, the force of the spring 116 moves the shaft 108 in the close direction, exhausting the hydraulic fluid in the first chamber 102A through the manifold 106 to the reservoir 4. Note that because the close command is in the spring direction, the motor 2 is not energized. When the valve reaches the fully closed position, a closed limit switch that is indicative of a closed state of the associated valve (not shown) and that is wired to the control circuitry of the electro-hydraulic actuator system 105 indicates that the valve has fully traveled to the desired position. The closed limit switch indication is utilized by the control circuitry to de-energize the closing solenoid 6. If the accumulator 40 is of a type that may be utilized to stroke the valve in the event of a pump or power failure, it will include valving that prevents the fluid in the accumulator 40 from draining to the reservoir 4.

While the illustrated electro-hydraulic actuator system 105 is shown in a spring-to-close configuration, it can also be configured in a spring-to-open configuration. In a spring-to-open configuration, the spring 116 drives the shaft 108 in the valve open direction. In such a configuration, it will be understood that the control circuitry must respond differently to open and close commands than in the spring-to-close configuration (e.g., to energize the motor 2 in response to a close command and to energize an opening solenoid that is akin to the closing solenoid 6 in response to a closing command).

FIG. 2 illustrates a double-acting configuration of an electro-hydraulic actuator system 105'. The double-acting configuration shown in FIG. 2 is largely similar to the spring return configuration shown in FIG. 1 and components that serve similar functions bear the same labels as used in FIG. 1. The primary distinction between the configurations of the system 105 in FIGS. 1 and 2 is the absence of the spring chamber 104 from the configuration in FIG. 2. In the double-acting configuration shown in FIG. 2, the movement of the shaft 108 and connector 112 is determined according to the balance of pressures of hydraulic fluid operating on each side of the piston 114 in the hydraulic chamber 102. Therefore, the hydraulic arrangement and control circuitry must be modified such that hydraulic fluid is delivered to the appropriate chamber 102A, 102B of the hydraulic chamber 102 in response to the various operational commands delivered to the system 105'.

Within the manifold 106, the ESD solenoid valve 17 is replaced by an opening solenoid valve 5. Both the opening solenoid valve 5 and the closing solenoid valve 6 are three-way solenoid valves that couple the chambers 102A, 102B to either the reservoir 4 or the pump 3's discharge based upon the electrical state of the solenoid valve 5, 6. A shuttle valve 31 prevents backflow from the chamber 102A, 102B that is coupled to the pump 3's discharge to the reservoir 4 through the de-energized solenoid valve 5, 6.

When an open command is issued to the electro-hydraulic actuator system 105', the opening solenoid valve 5 is energized, the closing solenoid valve 6 is de-energized, and the motor 2 is energized to drive the pump 3. In this configuration, the opening solenoid valve 5 couples the P1 port to the C1 port and the closing solenoid valve 6 couples the C2 port to the R port. The pressure differential across the shuttle valve 31 (i.e., the pump 3 discharge pressure on the valve 5 side as compared to the lower reservoir 4 pressure on the valve 6 side) prevents backflow from the chamber 102A to the reservoir 4 through the valve 6. Hydraulic fluid is drawn from the reservoir 4 by the pump 3 and transferred to the first chamber 102A. The pressure of the hydraulic fluid within the first chamber 102A operates on the area of the piston 114 to generate a force in the open direction. Because the chamber 102B is coupled through the closing solenoid valve 6 to the low-pressure reservoir 4, the force on the piston 114 in the open direction provided by the hydraulic fluid within the chamber 102A exceeds the force on the piston 114 in the closed direction provided by the hydraulic fluid within the chamber 102B, which causes the piston 114 to move in the open direction. As the piston 114 moves within the chamber 102, any fluid within the second chamber 102B is exhausted to the reservoir 4. When the valve reaches the fully open position, the valve's open limit switch indicates that the valve has fully traveled to the open position. Because the electro-hydraulic actuator system 105' is configured without an accumulator 40, the open limit switch indication is utilized by the control circuitry to de-energize the motor 2 and thus stop the pump 3 and to de-energize the opening solenoid valve 5. In this state, the chambers 102A, 102B are fluidly coupled to the reservoir 4. As a result, the forces operating on the piston 114 in both directions are equal, and the shaft 108, connector 112, and valve are maintained in the open position.

When a closed command is issued to the electro-hydraulic actuator system 105', the closing solenoid valve 6 is energized, the opening solenoid valve 5 is de-energized, and the motor 2 is energized to drive the pump 3. In this configuration, the closing solenoid valve 6 couples the P1 port to the C2 port and the closing solenoid valve 5 couples the C1 port to the R port. The pressure differential across the shuttle valve 31 (i.e., the pump 3 discharge pressure on the valve 6 side as compared to the lower reservoir 4 pressure on the valve 5 side) prevents backflow from the chamber 102B to the reservoir 4 through the valve 5. Hydraulic fluid is drawn from the reservoir 4 by the pump 3 and transferred to the second chamber 102B. The pressure of the hydraulic fluid within the second chamber 102B operates on the area of the piston 114 to generate a force in the close direction. Because the chamber 102A is coupled through the opening solenoid valve 5 to the low-pressure reservoir 4, the force on the piston 114 in the close direction provided by the hydraulic fluid within the chamber 102B exceeds the force on the piston 114 in the open direction provided by the hydraulic fluid within the chamber 102A, which causes the piston 114 to move in the close direction. As the piston 114 moves within the chamber 102, any fluid within the first chamber 102A is exhausted to the reservoir 4. When the valve reaches the fully closed position, the valve's closed limit switch indicates that the valve has fully traveled to the closed position. Because the electro-hydraulic actuator system 105' is configured without an accumulator 40, the closed limit switch indication is utilized by the control circuitry to de-energize the motor 2 and thus stop the pump 3 and to de-energize the closing solenoid valve 6. In this state, the chambers 102A, 102B are fluidly coupled to the reservoir 4. As a result, the forces operating on the piston 114 in both directions are equal, and the shaft 108, connector 112, and valve are maintained in the closed position.

FIG. 3 illustrates a double-acting configuration of an electro-hydraulic actuator system 105" that includes an accumulator 40 and an ESD solenoid valve 17. The configuration 105" shown in FIG. 3 is nearly identical to the configuration 105' shown in FIG. 2. However, in addition to the components in the configuration 105', the configuration 105" includes an accumulator 40 that is coupled to the P2 port of the manifold 106. The accumulator 40 is coupled through a control valve 29 (which can be adjusted to alter the opening and closing speed of the associated valve when the accumulator is utilized to stroke the valve) to the lines C-1 and C-2. In normal operation, the accumulator is isolated from lines C-1 and C-2 by manual three-way valves 14 and 15, respectively, which permit flow along lines C-1 and C-2 but prohibit flow from the accumulator 40 to lines C-1 and C-2 in normal operation. When the valve 14 is opened to permit flow from the accumulator 40 to the line C-1, hydraulic fluid from the accumulator 40 enters the chamber 102A and operates on the piston 114 to move the piston 114 and the shaft 108 and connector 112 in the open direction, exhausting any fluid from chamber 102B to the reservoir 4. Likewise, when the valve 15 is opened to permit flow from the accumulator 40 to the line C-2, hydraulic fluid from the accumulator 40 enters the chamber 102B and operates on the piston 114 to move the piston 114 and the shaft 108 and connector 112 in the close direction, exhausting any fluid from chamber 102A to the reservoir 4. A manual accumulator isolation valve 21 enables the accumulator 40 to be isolated from the manifold 106 (with a pressure switch 28 monitoring the P-7 line pressure on the accumulator 40 side of the valve 21). A manual accumulator drain valve 26 enables the accumulator 40 to be drained.

A three-way ESD solenoid valve 17 is coupled to the accumulator 40 (assuming the isolation valve 21 is in its normal, open state) via line P-8 and P-7. In normal operation, the ESD solenoid valve 17 is energized, which decouples the accumulator 40 from the hydraulic chamber 102 (unless one of the valves 14, 15 is used to stroke the valve via the accumulator). In the event of an emergency shutdown or a loss of power to the system 105", the ESD solenoid valve 17 transitions to the de-energized state, which permits fluid flow from the accumulator 40 through the ESD solenoid valve 17. In this state, the shuttle valve 27 permits flow from the ESD solenoid valve 17 to the port C4 but prevents flow from the ESD solenoid valve 17 to the port C3. The hydraulic pressure in the accumulator 40 thus flows from port C4 through lines C-4 and C-2 to chamber 102B, which again creates a pressure imbalance on the piston 114 and moves the piston 114 and the shaft 108 and connector 112 in the close direction to close the valve. Note that while there is a path from port C4 to the reservoir 4 through a de-energized closing solenoid valve 6, a plug 22 in such path ensures that the hydraulic fluid is directed to the chamber 102B to drive the valve to the closed position. While the illustrated version of the system 105" is configured such that hydraulic fluid from the accumulator 40 operates to close the valve when the ESD solenoid valve 17 is de-energized, in yet another alternative configuration the system may be configured such that he accumulator 40 operates to open the valve when the ESD solenoid valve 17 is de-energized.

As can be understood from the different configurations of the electro-hydraulic actuator system 105 shown in FIGS. 1-3, a number of different variables—spring return or double-acting, inclusion of a failsafe emergency shutdown mechanism, inclusion of an accumulator—impact the operation of the system 105 and require that control circuitry is properly configured to match the selected configuration. In addition, in any configuration, commands to the system 105 can be configured for two-wire operation (open and ESD signals), three-wire operation (open, close, and ESD signals), and four-wire operation (open, close, stop, and ESD signals), with such operations including maintained or momentary commands (i.e., the command to a particular state may either be maintained as an ON signal or toggled to an ON signal momentarily before transitioning back to an OFF signal). Moreover, alternate configurations having additional controllable instruments (e.g., additional valves and/or pump motors) are possible. The permutations of these various configurations require numerous different wiring arrangements to ensure proper operation for the selected configuration, which in turn makes field modifications to change the configuration difficult for users. Accordingly, the inventors recognized a need to develop standardized control circuitry that functions across different configurations of the electro-hydraulic actuator system 105 through simple switch selections and without complex wiring modifications.

Figure 4:
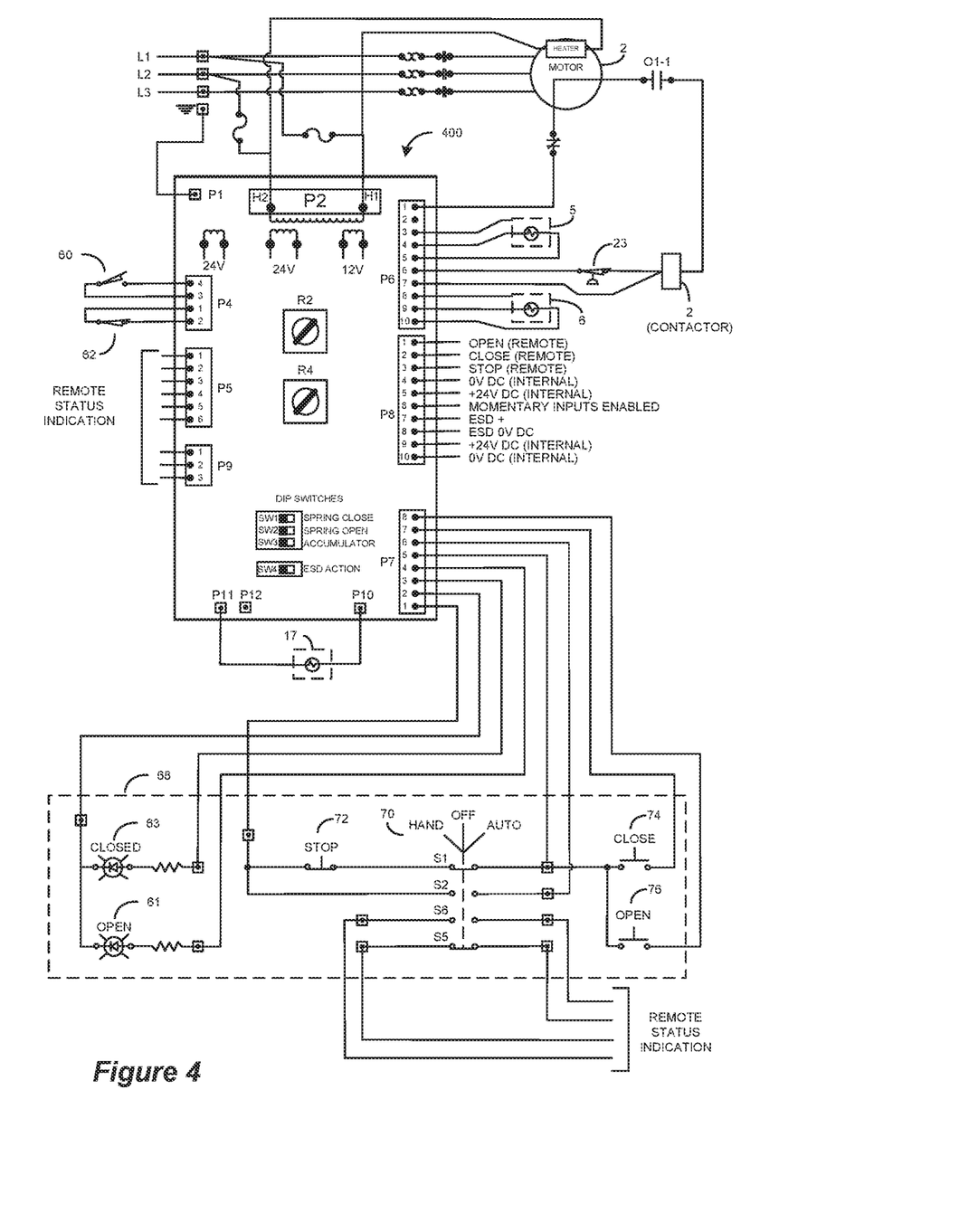
FIG. 4 is a wiring diagram that illustrates an interface between universal control circuitry and components of an electro-hydraulic actuator system in accordance with an embodiment of the disclosure.

FIG. 4 is a wiring diagram that illustrates the connection of the components of an electro-hydraulic actuator system 105 to an example control interface 400. The control interface 400 includes input and output channels (which, in the illustrated embodiment, comprise terminal blocks) that are configured to receive and provide signals for controlling the operation of the system 105. In addition, the control interface 400 includes multiple user-selectable inputs (e.g., DIP switches SW1-SW4 and timer inputs R2 and R4) that are representative of a configuration of the system 105. In the illustrated embodiment, the pump motor 2 is a three-phase AC motor that is powered from terminals L1, L2, and L3. It will be understood that a different type (e.g., single phase or DC) motor may also be used. Terminals L1 and L2 additionally supply terminals H1 and H2 of terminal block P2 of the control interface 400, which are coupled to the primary side of a power supply. Various taps on the secondary side of the power supply provide operating power that is utilized by the control circuitry (e.g., rectified to 12V and 24V DC power). In other embodiments, control circuitry operating power may be separately supplied to the interface 400 and not generated from the pump motor supply. For example, 24V DC and/or 12V DC power may be separately supplied to the control interface 400.

The P6 terminal block of the interface 400 is utilized to wire the pressure switch 23 input and the outputs to the opening solenoid valve 5, the closing solenoid valve 6, and the motor 2 contactor. In particular, the motor 2 contactor output is wired across terminals 1 and 6 of the P6 terminal block, the opening solenoid valve 5 is wired across terminals 4 and 5 of the P6 terminal block (with instrument ground wired to terminal 3), the closing solenoid valve 6 is wired across terminals 9 and 10 of the P6 terminal block (with instrument ground wired to terminal 8), and the pressure switch 23 input is wired in series with the supply to the motor 2 contactor with the feedback wired to terminal 7 of the P6 terminal block.

The P8 terminal block of the interface 400 receives the remote input commands to the system 105. In particular, terminals 1-3 of the P8 terminal block (i.e., the remote input channels) are configured to receive the remote open, close, and stop commands to the system 105, respectively. The ESD input is wired across terminals 7 and 8 of the P8 terminal block. Terminals 5 and 9 of the P8 terminal block receive the 24V DC internal power supply voltage and terminals 4 and 10 of the P8 terminal block receive the common node voltage of the internal 24V power supply. When terminal 6 of the P8 terminal block is coupled to the common node voltage (e.g., via a jumper connected between terminals 4 and 6 of the P8 terminal block), the open and close commands are enabled for momentary configuration (i.e., a transition from OFF to ON and back to OFF will be registered as a command to go to the particular state).

Figure 5:
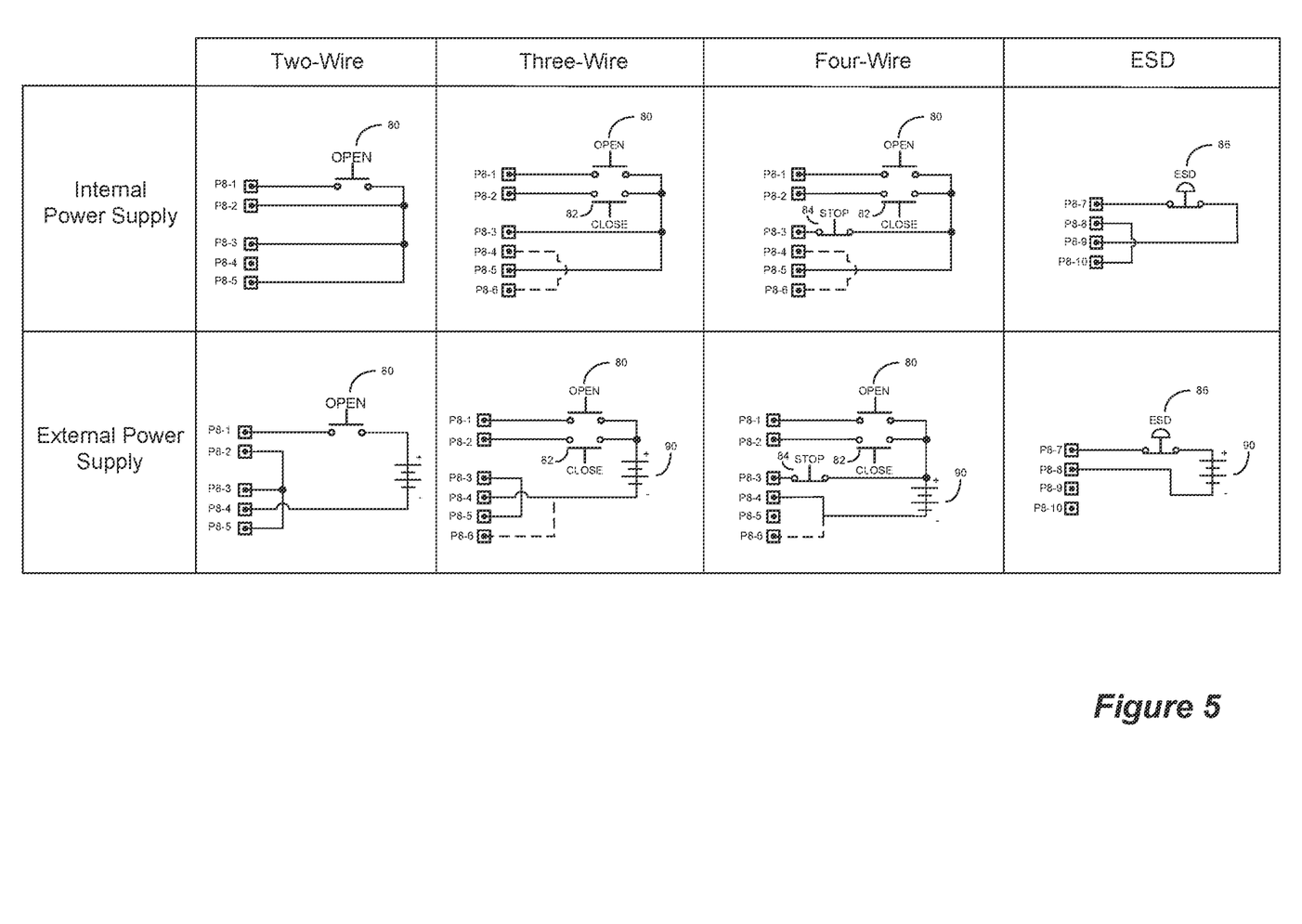
FIG. 5 is a wiring diagram showing various wiring configurations between remote commands and the interface of FIG. 4 in accordance with an embodiment of the disclosure.

Referring to FIG. 5, the remote open, close, and stop commands can be wired for either internal or external power and in one of two-wire, three-wire, and four-wire configurations. As noted above, the installation of a jumper across terminals 4 and 6 of the P8 terminal block converts the remote open and close commands to momentary configuration in the three-wire and four-wire configurations. In the two-wire configuration, the remote open contact 80 is wired in a maintained arrangement with the open input (terminal 1) energized to indicate a command to open and de-energized to indicate a command to close. For internal power, the internal 24V DC power source is supplied from terminal 5 of the P8 terminal block to terminals 2 and 3 (the close and stop inputs) of the P8 terminal block and also through the remote open contact 80 to terminal 1 of the P8 terminal block. For external power, an external power source 90 is wired between terminals 1 and 4 of the P8 terminal block in series with the remote open contact 80. The internal 24V DC power source is supplied from terminal 5 to terminals 2 and 3 (the close and stop inputs) of the P8 terminal block.

In the three-wire configuration, the remote open contact 80 and the remote close contact 82 are wired with the open input (terminal 1) energized to indicate a command to open and the close input (terminal 2) energized to indicate a command to close. For internal power, the internal 24V DC power source is supplied from terminal 5 of the P8 terminal block through the remote open contact 80 to terminal 1 of the P8 terminal block and through the remote close contact 82 to terminal 2 of the P8 terminal block as well as directly to terminal 3 (the stop input) of the P8 terminal block. For external power, an external power source 90 supplies power through the remote open contact 80 and the remote close contact 82 in parallel to terminals 1 and 2, respectively, of the P8 terminal block. The internal 24V DC power source is supplied from terminal 5 to terminal 3 (the stop input) of the P8 terminal block.

In the four-wire configuration, the remote open contact 80, the remote close contact 82, and the remote stop contact 84 are wired with the open input (terminal 1) energized to indicate a command to open, the close input (terminal 2) energized to indicate a command to close, and the stop input (terminal 3) de-energized to indicate a command to stop. For internal power, the internal 24V DC power source is supplied from terminal 5 of the P8 terminal block through the remote open contact 80, the remote close contact 82, and the remote stop contact 84 in parallel to terminals 1, 2, and 3, respectively, of the P8 terminal block. For external power, an external power source 90 supplies power through the remote open contact 80, the remote close contact 82, and the remote stop contact 84 in parallel to terminals 1, 2, and 3, respectively, of the P8 terminal block.

The ESD contact 86 must be made (i.e., closed) to keep the ESD solenoid 17 energized. For internal power, the internal 24V DC power source is supplied from terminal 9 of the P8 terminal block through the ESD contact 86, and the 24V DC power source common node voltage is wired from terminal 10 to terminal 8 of the P8 terminal block. For external power, an external power source 90 is wired in series with the ESD contact 86 across terminals 7 and 8 of the P8 terminal block.

Returning to FIG. 4, the ESD solenoid valve 17 is wired across the P10 terminal block and either the P11 or P12 terminal block. When wired across the P10 and P12 terminal blocks, the ESD solenoid valve 17 is wired directly in series with the ESD contact 86. When wired across the P10 and P11 terminal blocks, the ESD solenoid valve 17 is wired in series with the ESD contact 86 as well as a normally open (NO) power failure contact of a local relay having its coil energized by the 24V DC internal power supply voltage. In this configuration, the ESD solenoid valve 17 will be de-energized not only when the ESD contact 86 is open but also when a failure of the internal 24V DC power supply de-energizes the relay to open the NO power failure contact.

The P4 terminal block receives signals wired through the open limit switch 60 and closed limit switch 62 that indicate the fully open and fully closed positions, respectively, of the valve that is actuated by the system 105. In particular, the open limit switch 60 is wired across terminals 3 and 4 of the P8 terminal block and the closed limit switch 62 is wired across terminals 1 and 2 of the P4 terminal block. Terminals 1 and 3 of the P4 terminal block provide internal 24V DC power to the open limit switch 60 and the closed limit switch 62, respectively. The return signal from the open limit switch 60 is wired to terminal 4 of the P4 terminal block, terminal 3 of the P7 terminal block, the local close indicator light 63, and to terminal 2 of the P7 terminal block, which is referenced to the internal 24V DC power supply common node voltage. The return signal from the closed limit switch 62 is wired to terminal 2 of the P4 terminal block, terminal 4 of the P7 terminal block, the local open indicator light 61, and to terminal 2 of the P7 terminal block. When the valve is at either limit, the limit switch will be open, which will cause the opposite indicator light (i.e., the close indicator light 63 when the valve reaches the open limit switch 60) to be OFF. When the valve is traveling (i.e., is not in either the fully open or fully closed position), both of the indicator lights 61, 63 will be illuminated. The P5 and P9 terminal blocks are used to enable remote monitoring of various components of the system 100, such as limit switch status, pressure switch status, hand/off/auto switch status, etc.

The P7 terminal block additionally provides internal 24V power to the local switch module 68, which is located near the actuator 100, from its terminal 1. The local switch module 68 includes a hand/off/auto (HOA) switch 70, a normally-closed stop switch 72, a normally-open close switch 74, and a normally-open open switch 76, which are wired to local mode selector input channels of the P7 terminal block (i.e., terminals 5-8 of the P7 terminal block). The S1 contact of the HOA switch 70 is made when the HOA switch 70 is placed in the HAND state, which gives control of the actuator 100 to the commands issued via the local switch module 68. The S2 contact of the HOA switch 70 is made when the HOA switch 70 is placed in the AUTO state, which gives control of the actuator 100 to the commands issued via the remote open, close, and stop contacts that are wired to the P8 terminal block. The local stop switch 72 is wired in series with the S1 contact of the HOA switch 70 across terminals 1 and 5 of the P7 terminal block. When the HOA switch 70 is placed in the HAND state and the stop switch 72 is in the normal (i.e., not stop) state, there will be 24V at terminal 5 of the P7 terminal block. The S2 contact of the HOA switch 70 is wired across terminals 1 and 6 of the P7 terminal block. When the HOA switch 70 is placed in the AUTO state, there will be 24V at terminal 6 of the P7 terminal block. The local close switch 74 and the local open switch 76 are wired in parallel with each other and in series with the S1 contact of the HOA switch 70, to terminals 7 and 8 of the P7 terminal block, respectively. Thus, when the HOA switch 70 is placed in the HAND state and the stop switch 72 is in the normal (i.e., not stop) state, selecting the closed switch 74 will deliver 24V to terminal 7 of the P7 terminal block and selecting the open switch 76 will deliver 24V to terminal 8 of the P7 terminal block.

The interface 400 additionally includes multiple user adjustable inputs. Control knobs R2 and R4 enable the user to modify open and close timers, respectively, as will be described in greater detail below. DIP switches SW1-SW4 enable the user to select whether the system 105 is configured for spring return with spring fail closed arrangement (switch SW1), spring return with spring fail open arrangement (switch SW2), accumulator included (switch SW3), and motor action upon ESD (switch SW4). The functions of these switches within the control circuitry will be described below.

Figure 6:
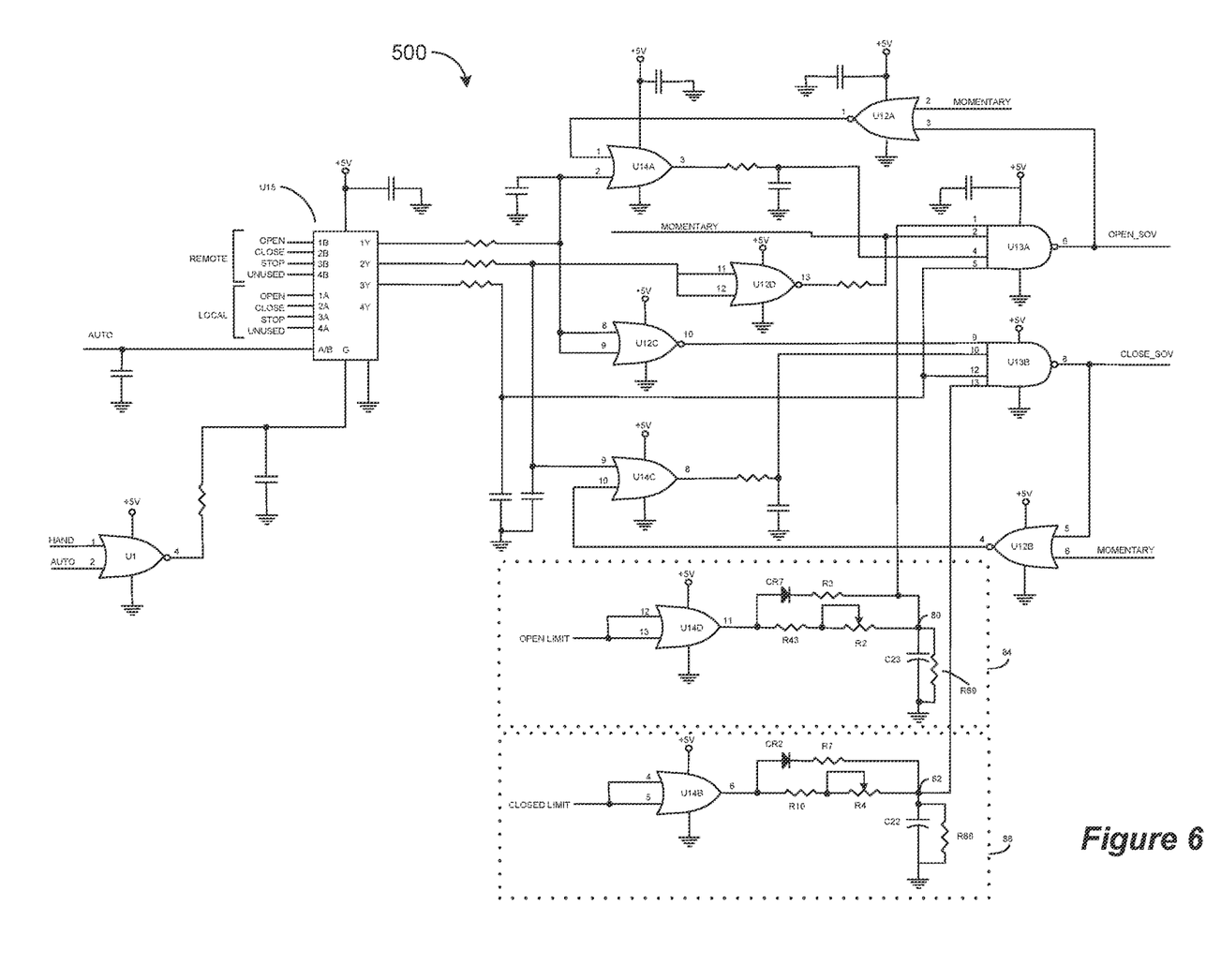
FIG. 6 is a logic diagram that illustrates universal control circuitry for controlling outputs to opening and closing solenoid valves of an electro-hydraulic actuator system in accordance with an embodiment of the disclosure.

FIG. 6 is a control logic diagram that illustrates example standardized control circuitry 500 for an electro-hydraulic actuator system 105 in accordance with an aspect of this disclosure. It is important to note that the control circuitry includes a plurality of physical logic gate components as opposed to a more complex and more expensive microcontroller-based system. While various logic gate components are illustrated as separate components, they may actually be combined within a single component. For example, each separate NOR gate may be a different channel of a four-channel NOR gate, etc. For this reason, extra channels of a multi-channel logic gate component are utilized for a different functionality (e.g., an extra channel of a NOR gate may receive the same input at each of its input ports to change the function of a NOR gate to a NOT gate). It will be understood that the logic functionality may be accomplished in ways other than those shown. While not specifically illustrated in FIG. 6, the signals that are wired to the interface 400 shown in FIG. 4 are electrically isolated from corresponding logic signals that are utilized within the control circuitry 500. For example, each input to the interface 400 may be wired through an opto-isolator that generates a corresponding digital signal at the control logic voltage level (e.g., 5V DC) for use within the control circuitry 500.

The control circuitry 500 includes a multiplexer U15 that is configured to route the appropriate open, close, and stop signals (i.e., either remote or local signals) based upon the signal at its A/B input. More specifically, if the signal at the A/B input of the multiplexer U15 is ON, the multiplexer routes the signals at terminals 1B, 2B, 3B, and 4B to terminals 1Y, 2Y, 3Y, and 4Y, respectively. Conversely, if the signal at the A/B input of the multiplexer U15 is OFF, the multiplexer routes the signals at terminals 1A, 2A, 3A, and 4A to terminals 1Y, 2Y, 3Y, and 4Y, respectively. The signal that is connected to the A/B input of the multiplexer U15 corresponds to the S2 contact of the HOA switch 70. So, when the HOA switch 70 is set to the AUTO state, the remote open, close, and stop signals (which correspond to the signals received at terminals 1, 2, and 3 of terminal block P8, respectively) are routed to the terminals 1Y, 2Y, and 3Y, respectively, of the multiplexer U15. When the HOA switch is set to the HAND or OFF state, the A/B input to the multiplexer U15 will be in the OFF state and the local open, close, and stop signals (which match the signals received at terminals 8, 7, and 5 of terminal block P7, respectively) are routed to the terminals 1Y, 2Y, and 3Y, respectively, of the multiplexer U15. Note that the local stop signal (when in the OFF state) may be indicative of either the local stop switch 72 being set to the STOP state or the HOA switch 70 being set to the OFF state, which are treated as equivalent inputs by the control circuitry 500. When the HOA switch 72 is in the OFF state, the HAND and AUTO signals to the NOR gate U1 are both OFF, which results in the input to the G terminal of the multiplexer U15 being set to ON. When the G terminal of the multiplexer U15 receives an ON signal, the outputs 1Y-4Y are all set to OFF, which is equivalent to the receipt of a local or remote stop command.

When an open command is sent to the system 105 (either via the local open switch 76 or the remote open contact), the terminal 1Y of the multiplexer U15 is ON. This open signal is routed from the multiplexer U15 to an OR gate U14A and a NOR gate U12C. The ON signal at terminal 2 of the OR gate U14A ensures that the output at terminal 3 of the OR gate U14A will also be ON, regardless of the state of the signal at terminal 1 of the OR gate U14A. The output of the U14A gate is routed to terminal 4 of a NAND gate U13A. As is known, the output of a NAND gate will be ON if any of its inputs is OFF and will be OFF only when all of its inputs are ON. When the input at terminal 2 of the NAND gate U13A is ON to indicate a command to open the valve and the other inputs to the NAND gate U13A are ON to indicate that the system 105 is not being commanded to close (terminal 2), not commanded to stop (terminal 5), and the valve is not open (terminal 1), the output at terminal 6 of the NAND gate U13A will be OFF. When the output of the NAND gate U13A at terminal 6 is OFF, the opening solenoid valve 5 is energized.

The output of the NAND gate U13A at terminal 6 is additionally routed to the input terminal 3 of a NOR gate U12A, which further receives an input at its terminal 2 that is indicative of the momentary configuration of inputs. The NOR gate U12A is configured to seal in an open command when the interface 400 is configured for momentary inputs (e.g., when a jumper is installed between terminals 4 and 6 of the P8 terminal block). More specifically, when the interface 400 is configured for momentary inputs, the input at terminal 2 of the NOR gate U12A is OFF. Thus, when an open command results in the output at terminal 6 of the NAND gate U13A transitioning to OFF (to energize the opening solenoid valve 5) and the interface 400 is configured for momentary inputs, the ON output at terminal 1 of the NOR gate U12A, which output is configured in an OR arrangement with the open command at the 1Y terminal of the multiplexer U15 via the OR gate U14A, ensures that the open command signal that is routed to input terminal 4 of the NAND gate U13A will be maintained in the ON state even after the momentary open input transitions back to the OFF state. This sealed in open command will be maintained until the output of the NAND gate U13A transitions back to the ON state.

Once the output of the NAND gate U13A is in the OFF state to energize the opening solenoid valve 5, it is maintained in that state (thus continuing to energize the opening solenoid valve 5) until one of the inputs to the NAND gate U13A transitions to the OFF state. This can occur when the interface 400 is configured for maintained inputs and the open command transitions to OFF (terminal 4 of NAND gate U13A transitions to the OFF state), when a closed command is received (i.e., the output 2Y of the multiplexer U15 is ON) (terminal 2 of NAND gate U13A transitions to the OFF state), when a stop command is received (i.e., the output 3Y of the multiplexer U15 is OFF) (terminal 5 of NAND gate U13A transitions to the OFF state), or when the valve has reached the open limit switch 60 for a time set by the R2 open timer (terminal 1 of NAND gate U13A transitions to the OFF state). The OPEN LIMIT signal that is wired to both inputs of the OR gate U14D matches the status of the open limit switch 60. As illustrated in FIG. 4, the open limit switch 60 is wired in the normally closed mode such that the switch 60 is closed when the valve is not in the open position and the switch 60 is open when the valve is in the open position. When the valve is not in the open position, the inputs to both terminals 12 and 13 of the OR gate U14D are in the ON state, and, consequently the output at terminal 11 is also in the ON state. This ON signal is routed via a low impedance path through diode CR7 and resistor R3 (e.g., a 1 KΩ resistor) to terminal 1 of the NAND gate U13A. This low impedance path ensures that the transition of the limit switch 60 from the open valve position to the not open valve position is quickly communicated to the NAND gate U13A. When the output of the OR gate U14D is in the ON state, the capacitor C23, which receives the logic operating voltage (e.g., 5V) across its plates when the output of the OR gate U14D is ON, is charged. In one embodiment, the capacitor C23 may be a 1000 μF capacitor, although it will be understood that other types of capacitors might also be used. The R2 resistor is a user-adjustable potentiometer. In one embodiment, the resistance of the R2 potentiometer may be adjusted up to a maximum value of 20 KΩ. The resistor R43 provides a relatively lower level of resistance (e.g., 1 KΩ). When the valve reaches the open limit switch and the open limit switch transitions from ON to OFF, the output at terminal 11 of the OR gate U14D also transitions to OFF. Because the diode CR7 prevents the capacitor 23 from discharging through the low impedance path through R3, C23 discharges through R2 and R43. The voltage at the node 80 (which is referenced to the input terminal 1 of the NAND gate U13A) thus decays in accordance with the series RC time constant that is set by the capacitance of capacitor C23 and the series resistance of potentiometer R2 and resistor R43. Based on an example C23 capacitance of 1000 μF and a R2 and R43 series resistance of between 2 KΩ and 21 KΩ, the voltage at the input terminal 1 of the NAND gate U13A can be configured to decay below the ON detection level of the NAND gate U13A between 1.5 and 15 seconds after the open limit switch 60 is made by adjusting the potentiometer R2 via the interface 400. This is an important feature as it may be difficult to adjust the valve limit switches to correspond exactly to the valve's stroke. If the opening or closing solenoid valve 5,6 is de-energized exactly when the corresponding limit switch 60, 62 indicates that the valve has reached the desired position, the valve may not ever make it to the fully open or closed position if the limit switch is set short of the fully open or closed position. The time delay circuitry 84, 86 enables the user to set an additional amount of time that the opening and closing solenoid valves 5, 6, respectively, remain energized following the transition of the open and closed limit switches 60, 62 indicating that the corresponding state of the valve has been reached.

While the control circuitry logic has been described with respect to an open command to generate a control signal to energize the opening solenoid valve 5, the logic with respect to a closed command to generate a control signal to energize the closing solenoid valve 6 is exactly analogous. The U14A, U12D, U13A, U12A, and U14D logic gates correspond to the U14C, U12C, U13B, U12B, and U14B logic gates. Specifically, the output at terminal 8 of the NAND gate U13B transitions to the OFF state to energize the closing solenoid valve when a closed command is received (i.e., terminal 2Y of the multiplexer U15 is ON), the valve is not in the closed position, the valve is not commanded to open, and the valve is not commanded to stop. Once the output of the NAND gate U13B is in the OFF state to energize the closing solenoid valve 6, it is maintained in that state (thus continuing to energize the closing solenoid valve 5) until one of the inputs to the NAND gate U13B transitions to the OFF state. This can occur when the interface 400 is configured for maintained inputs and the close command transitions to OFF (terminal 10 of NAND gate U13B transitions to the OFF state), when an open command is received (i.e., the output 1Y of the multiplexer U15 is ON) (terminal 9 of NAND gate U13B transitions to the OFF state), when a stop command is received (i.e., the output 3Y of the multiplexer U15 is OFF) (terminal 12 of NAND gate U13B transitions to the OFF state), or when the valve has reached the closed limit switch 62 for a time set by the R4 close timer (terminal 13 of NAND gate U13B transitions to the OFF state). The time delay circuitry 86 is analogous to the time delay circuitry 84.

Figure 7:
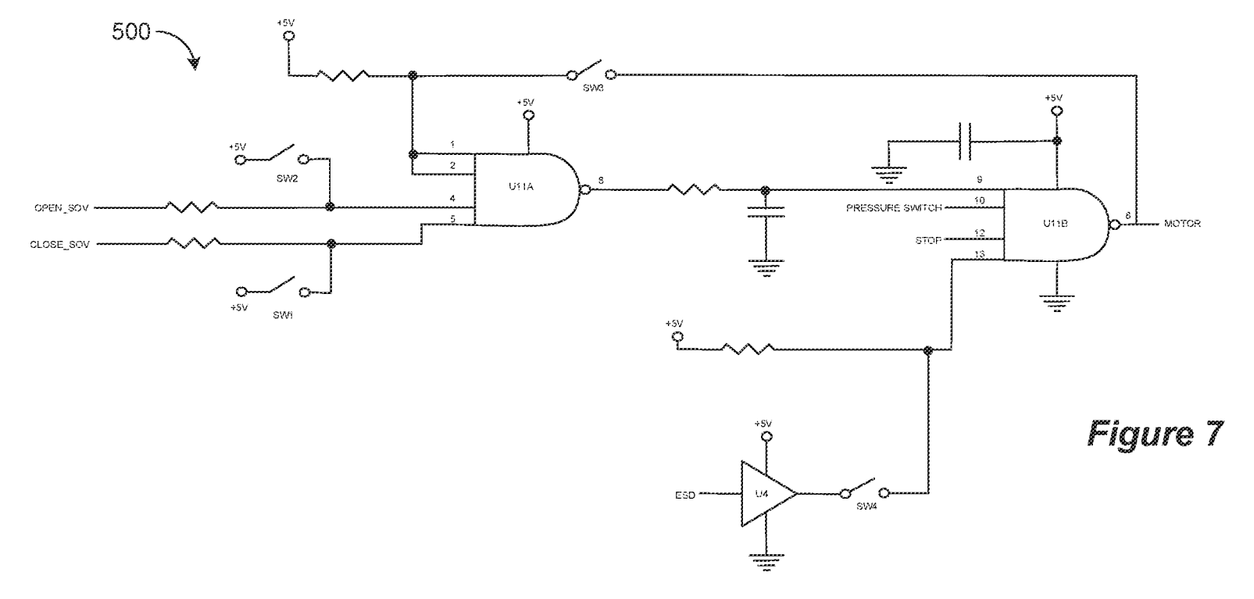
FIG. 7 is a logic diagram that illustrates universal control circuitry for controlling outputs to a hydraulic fluid pump motor of an electro-hydraulic actuator system in accordance with an embodiment of the disclosure.

FIG. 7 is a control logic diagram that illustrates example standardized control circuitry 500 for controlling the output to run the pump 3 motor 2. There are multiple permissives that are required to be maintained to run the pump 3 motor 2. The permissives include the pressure switch 23 not indicating high pressure (terminal 10 of NAND gate U11B), no stop command (i.e., output 3Y of multiplexer U15) (terminal 12 of NAND gate U11B), and, if the DIP switch SW4 is enabled to cause the motor 2 not to run during an emergency shutdown, the ESD contact 86 indicating the normal state (i.e., terminal 7 of the P8 terminal block is energized) (terminal 13 of NAND gate U11B). If any one of these permissives is lost at any time, the pump 3 motor 2 will not run. If all of these permissives are made, the output at terminal 8 of the NAND gate U11B (which causes the motor 2's contactor to be energized when the MOTOR signal is in the OFF state) is determined based upon the opening and closing solenoid logic as well as the status of the DIP switches SW1-SW3. The OPEN_SOV and CLOSE_SOV control signals (shown in FIG. 6) are wired to the NAND gate U11A.

When the OPEN_SOV control signal is in the OFF state to cause the opening solenoid valve 5 to be energized, the output of the NAND gate U11A will be in the ON state (which will result in the motor 2 being run if the other motor permissives are met) unless the DIP switch SW2 is set to indicate a spring-to-open configuration of the system 105. If the DIP switch SW2 is set to indicate a spring-to-open configuration of the system 105, the terminal 4 input to the NAND gate U11A will remain in the ON state despite the OFF state of the OPEN_SOV signal, and the output to the motor 2 contactor will not be energized. Thus, by simply setting the DIP switch SW2, the motor 2 will not run when the valve is commanded to the open state. Instead, the opening solenoid valve 5 will be energized and the spring 116 will drive the valve to the open position without operating the pump 3. Likewise, when the CLOSE_SOV control signal is in the OFF state to cause the closing solenoid valve 6 to be energized, the output of the NAND gate U11A will be in the ON state (which will result in the motor 2 being run if the other motor permissives are met) unless the DIP switch SW1 is set to indicate a spring-to-close configuration of the system 105. If the DIP switch SW1 is set to indicate a spring-to-close configuration of the system 105, the terminal 5 input to the NAND gate U11A will remain in the ON state despite the OFF state of the CLOSE_SOV signal, and the output to the motor 2 contactor will not be energized. Thus, by simply setting the DIP switch SW1, the motor 2 will not run when the valve is commanded to the close state. Instead, the closing solenoid valve 6 will be energized and the spring 116 will drive the valve to the closed position without operating the pump 3.

If the system 105 does not include an accumulator 40 (i.e., DIP switch SW3 is open), the motor 2's contactor will be de-energized to stop the motor 2 at the same time that the opening or closing solenoid valve 5, 6 is de-energized. However, if the system does include an accumulator 40, the DIP switch SW3 seals in the MOTOR control signal by routing the OFF signal to the input of the NAND gate U11A (terminals 1 and 2 of NAND gate U11A) to ensure that the transition to the ON state of either OPEN_SOV or CLOSE_SOV signal in conjunction with the de-energization of the opening or closing solenoid valve 5, 6 does not cause the output at terminal 6 of the NAND gate U11A to transition to the OFF state to stop the motor 2 (i.e., via the MOTOR control signal). In the configuration in which the presence of an accumulator 40 is indicated by setting the DIP switch SW3, the MOTOR control signal will only return to the ON state upon loss of one of the permissives described above (i.e., high pressure indication from the pressure switch 23, valve stop command, or ESD command with SW4 set to prevent the motor from running during an ESD trip). In normal operation, this means that the motor 2 will continue to run the pump 3 until the pressure switch 23 indicates high pressure, thus ensuring that the accumulator 40 remains fully pressurized and ready to function when needed.

While the outputs to the field devices are not specifically shown, it will be understood that such outputs may follow the states of the OPEN_SOV, CLOSE_SOV, and MOTOR control signals. For example, in one embodiment, when each of the OPEN_SOV, CLOSE_SOV, and MOTOR control signals is OFF, a circuit is completed through the LED portions of a closing solenoid opto-isolator, an opening solenoid opto-isolator, and a motor contactor opto-isolator, respectively. The completion of circuits through the LED portions of such opto-isolators may likewise complete a circuit through the isolated circuit portion of the opto-isolators—e.g., to complete a 24V circuit to energize the opening solenoid valve 5, the closing solenoid valve 6, and the motor 2 contactor.

While the invention herein disclosed has been described in terms of specific embodiments and applications thereof, numerous modifications and variations could be made thereto by those skilled in the art without departing from the scope of the invention set forth in the claims.

What is claimed is:
1. Control circuitry for a system that comprises a hydraulic valve actuator, comprising:
one or more input channels that are each configured to receive an operational command;
one or more user-selectable inputs that are representative of a configuration of the hydraulic valve actuator, the one or more user-selectable inputs comprising one or more inputs to indicate whether the hydraulic valve actuator is configured as spring-to-open or spring-to-close;
a motor output that is configured to cause a motor that is coupled to a hydraulic fluid pump to run;
one or more valve outputs that are each configured to control an open or closed state of an associated valve, wherein each of the one or more valves is configured to control a flow of hydraulic fluid within the system; and
a plurality of physical logic gates that are responsive to at least signals received at the one or more input channels and the one or more user-selectable inputs to determine a state of the motor output and the one or more valve outputs.

2. The control circuitry of claim 1, wherein the one or more input channels comprise one or more local input channels and one or more remote input channels.

3. The control circuitry of claim 2, further comprising:
a mode selector input channel that is configured to receive a signal that indicates whether the system is controlled via local signals at the one or more local input channels or remote signals at the one or more remote input channels; and
a multiplexer that is configured to pass either the local signals or the remote signals to the plurality of physical logic gates based upon a state of a mode selector signal at the mode selector input channel.

4. The control circuitry of claim 1, wherein the one or more input channels comprise an emergency shutdown input channel configured to receive an emergency shut down command.

5. The control circuitry of claim 1, wherein the one or more user-selectable inputs comprise a user-selectable input to indicate whether or not the system includes an accumulator.

6. The control circuitry of claim 1, further comprising one or more system status input channels, wherein each of at least one system status input channels of the one or more system status input channels is configured to receive a signal that is representative of at least one of an indication that a valve that is coupled to the hydraulic valve actuator is open, an indication that the valve that is coupled to the hydraulic valve actuator is closed, or an indication that a pressure within a hydraulic chamber of the hydraulic valve actuator is above a threshold.

7. The control circuitry of claim 6, wherein:
one of the one or more user-selectable inputs is a resistance of a variable resistor; and
an output of a first one of the plurality of physical logic gates is coupled to an input of a second one of the plurality of physical logic gates via a first path through the variable resistor and a second path through a diode, wherein the first path and the second path are in parallel.

8. The control circuitry of claim 7, further comprising a capacitor that is charged by a control voltage via the first path and the second path when an output of the first one of the physical logic gates is in a first state.

9. The control circuitry of claim 8, wherein the capacitor discharges through the first path and not the second path when the output of the first one of the physical logic gates is in a second state, and wherein the resistance of the variable resistor determines a rate of discharge of the capacitor.

10. The control circuitry of claim 9, wherein the first path provides a first delay time for a transition of the input of the second one of the physical logic gates to the first state, and wherein the second path provides a second delay time, which is adjustable by a user via the variable resistor, for a transition of the input of the second one of the physical logic gates to the second state.

11. The control circuitry of claim 1, wherein the one or more input channels indicate whether operational commands are enabled for momentary configuration or maintained configuration.

12. The control circuitry of claim 11, wherein the one or more input channels indicate that operational commands are enabled for momentary configuration when one of the input channels is coupled to a common voltage via a jumper.

13. The control circuitry of claim 1, wherein the one or more user-selectable inputs comprise one or more inputs to indicate whether the hydraulic valve actuator is configured as double-acting or single-acting.

14. The control circuitry of claim 1, wherein the one or more inputs to indicate whether the hydraulic valve actuator is configured as spring-to-open or spring-to-close affect the motor output.

15. An electro-hydraulic valve actuator system, comprising:
- a hydraulic valve actuator;
- a hydraulic fluid circuit comprising hydraulic fluid conduit, a hydraulic fluid reservoir, one or more controllable valves that direct flow through the hydraulic fluid conduit, and one or more hydraulic fluid pumps; and
- control circuitry that is configured to control a state of the one or more controllable valves and the one or more hydraulic fluid pumps, comprising:
  - a plurality of physical logic gates that receive signals that are indicative of a configuration of the system and an operational state of the system to generate outputs to control the state of the one or more controllable valves and the one or more hydraulic fluid pumps, wherein the signals that are indicative of the configuration of the system include one or more signals that are generated via one or more switches to indicate whether the hydraulic valve actuator is configured as spring-to-open or spring-to-close.

16. The electro-hydraulic valve actuator system of claim 15, further comprising a local switch panel that includes a hand/off/auto switch, a close switch, an open switch, and a stop switch.

17. The electro-hydraulic valve actuator system of claim 16, wherein:
- the control circuitry comprises remote inputs that are configured to receive a remote close command, a remote open command, and a remote stop command; and
- the control circuitry comprises a multiplexer that is configured to pass signals from the local switch panel or from the remote inputs based upon a state of the hand/off/auto switch.

18. The electro-hydraulic valve actuator system of claim 15, further comprising an accumulator configured to:
- allow at least one of the one or more controllable valves to be stroked without operating at least one of the one or more hydraulic fluid pumps; or
- provide a volume for thermal expansion of hydraulic fluid.

19. The electro-hydraulic valve actuator system of claim 18, further comprising an emergency shutdown solenoid valve coupled to the accumulator and configured to transition from an energized state to a de-energized responsive to an emergency shutdown command or a loss of power to the electro-hydraulic valve actuator system to permit fluid flow from the accumulator through the emergency shutdown solenoid valve.

20. The electro-hydraulic valve actuator system of claim 15, wherein the signals that are indicative of a configuration of the system include one or more signals that are generated via one or more switches to indicate whether the hydraulic valve actuator is configured as double-acting or single-acting.

* * * * *